US008127721B2

(12) United States Patent
Moran

(10) Patent No.: US 8,127,721 B2
(45) Date of Patent: Mar. 6, 2012

(54) SURGICAL ISOLATOR

(75) Inventor: Leonard Michael Moran, Mayo (IE)

(73) Assignee: Ovagen International Limited, Carrentrila (IE)

( * ) Notice: Subject to any disclaimer, the term of this patent is extended or adjusted under 35 U.S.C. 154(b) by 575 days.

(21) Appl. No.: 12/279,601

(22) PCT Filed: Feb. 23, 2006

(86) PCT No.: PCT/EP2006/060241

§ 371 (c)(1),
(2), (4) Date: Oct. 22, 2008

(87) PCT Pub. No.: WO2007/095998

PCT Pub. Date: Aug. 30, 2007

(65) Prior Publication Data

US 2009/0099575 A1 Apr. 16, 2009

(51) Int. Cl.
*A01K 37/00* (2006.01)
*A61D 1/08* (2006.01)

(52) U.S. Cl. ......... 119/713; 119/417; 119/757; 606/135

(58) Field of Classification Search .................. 119/713, 119/417, 418, 728, 756, 757; 128/869, 846, 128/870; 606/137, 135, 116, 117
See application file for complete search history.

(56) References Cited

U.S. PATENT DOCUMENTS 1,717,532 A * 6/1929 Trees ............................ 119/722
(Continued)

FOREIGN PATENT DOCUMENTS

FR 2848410 6/2004
(Continued)

OTHER PUBLICATIONS

International Search Report mailed Oct. 18, 2006 for International Application No. PCT/EP2006/060241 (3 pgs.).

(Continued)

*Primary Examiner* — Yvonne R. Abbott
(74) *Attorney, Agent, or Firm* — K&L Gates LLP

(57) ABSTRACT

This invention is directed to a surgical isolator and cradle, suitable for the use in a surgical method involving the removal of prematura eggs from birds in order to generate germ-free eggs and birds. In particular, the surgical isolator is used in the generation of birds of specified germ-free status.

8 Claims, 3 Drawing Sheets

U.S. PATENT DOCUMENTS

| | | | | |
|---|---|---|---|---|
| 2,484,088 | A | 10/1949 | Hayes | |
| 3,717,128 | A * | 2/1973 | Pearman et al. | 119/757 |
| 4,111,753 | A * | 9/1978 | Folsom et al. | 435/3 |
| 4,184,451 | A * | 1/1980 | Carlin | 119/755 |
| 4,214,556 | A * | 7/1980 | Knox et al. | 119/754 |
| 4,407,232 | A * | 10/1983 | Konz | 119/722 |
| 4,407,234 | A * | 10/1983 | Kleman | 119/672 |
| 4,657,004 | A * | 4/1987 | Coffey | 128/869 |
| 5,146,635 | A * | 9/1992 | Gastle et al. | 5/620 |
| 5,243,931 | A * | 9/1993 | McDonough | 119/671 |
| 5,826,286 | A * | 10/1998 | Cranston | 5/606 |
| 6,910,445 | B1 * | 6/2005 | Manthei et al. | 119/420 |
| 6,953,008 | B1 * | 10/2005 | Remmler | 119/757 |
| 7,040,254 | B1 * | 5/2006 | Rucker et al. | 119/675 |
| 7,146,936 | B2 * | 12/2006 | Dazai et al. | 119/756 |
| 7,421,978 | B2 * | 9/2008 | Price | 119/671 |
| 7,886,948 | B2 * | 2/2011 | Kerr | 224/519 |
| 2006/0156996 | A1 * | 7/2006 | Henry | 119/751 |

FOREIGN PATENT DOCUMENTS

| | | |
|---|---|---|
| JP | 2004147886 | 5/2004 |
| SU | 852323 | 8/1981 |

OTHER PUBLICATIONS

Written Opinion of the International Searching Authority for International Application No. PCT/EP2006/060241 (6 pgs.), Oct. 18, 2006.

* cited by examiner

SURGICAL ISOLATOR

CROSS REFERENCE TO RELATED APPLICATIONS

This application is the U.S. National Phase Application of International Patent Application Serial No. PCT/EP2006/060241, filed Feb. 23, 2006, published under PCT Article 21(2) in English, the entire disclosure of which is incorporated by reference herein.

FIELD OF THE INVENTION

The present invention is directed to a surgical isolator and cradle, suitable (or the use in a surgical method for removal of premature eggs from birds in order to generate germ-free eggs and birds.

BACKGROUND TO THE INVENTION

The first surgical isolators were developed for use in gnotobiotics where germ-free laboratory animals were obtained by delivering such animals from their parents by Caesarean section directly into an aseptic environment.

European patent application no. 01650109 is directed to a method of rearing a bird of specified contamination free status. The method of this application comprises housing a bird as a parent bird, surgically removing an egg in its shelf from the parent bird prior to transfer of the egg to the cloaca in the parent bird, incubating the egg and hatching the egg to produce a laying bird. The application also relates to the production of avian eggs of specified contamination free status.

The present invention is concerned with a surgical isolator and cradle for use in sterile procedures for obtaining eggs and birds of specified germ-free status.

In this specification, the term "contamination free/germ-free" is used very broadly and relates to many pathogens and infections that can be carried by birds, particularly, poultry such as chickens and turkeys which are used widely to produce flocks of birds for breeding to produce fertile eggs for commercial production and to produce eggs and meat for human consumption. Further, such eggs and birds are used in the manufacture of a wide range of biological substances including vaccines, antibodies, monoclonal antibodies, fibroblasts and proteins, both for therapeutic and prophylactic use in people and animals. They are further used extensively for diagnostic tests and the production of transgenic eggs and birds. Many of these uses require eggs and/or the birds produced from them to be free of either all or specified contaminants such as infections, including a variety of species of parasite, bacteria, mycoplasma, viruses, retroviruses, prions, DNA and RNA fragments. Sometimes, the viruses can be small viruses including picoma and parvo viruses. Some of the bacteria from which eggs are often contaminated include Clostridia and Enterobacteria. There are many non-pathogenic organisms that should be controlled. Similarly, many of the microorganisms which include parasites, aerobic and anaerobic bacteria, commensal species and species associated with the gut, are undesirable. Similarly, mycoplasma, viruses including retroviruses, prions, fungi, yeast and moulds are also undesirable.

Therefore, the term "specified contamination free" or "germ-free status" could include some or all of these and is much broader than just free of specified pathogens. For example, conventional specific pathogen free (SPF) are not specified free from some viruses and indeed can be contaminated with bacteria. Thus, for certain uses, these may be sufficient. The use to which the eggs and the birds are to be put will determine the contaminants that the egg or bird must be free of. Conventional germ free and some SPF eggs are derived by treating fresh naturally laid eggs with chemicals, including disinfectants and antibiotics, and placing them in isolators. Such naturally laid eggs are taken from selected parent stock birds. White these methods have been relatively successful in the production of SPF eggs, they have not been truly successful in producing what are contaminant free eggs. However, the chemicals are not able to eliminate contamination from, for example, bacteria entering the pores of the eggshell immediately after laying and before disinfection. Contamination of eggs, whether SPF, germ-free or gnotobiotic, results in loss of compliance with specifications and, in many instances, toss of commercial value and a utility.

STATEMENT OF THE INVENTION

According to a first aspect of the invention, there is provided a sterile surgical isolator and cradle for a bird which provides a contaminant-free atmosphere in which a surgical procedure is performed comprising

- an isolator made of walls with at least two gloved ports, a solid isolator floor which provides an operating surface and a surgical port within the solid isolator floor;
- a cradle (or receiving and positioning a bird during a sterile surgical procedure having an open and closed position;
- wherein the cradle enables the stable positioning of the operating surface of the bird relative to the operating surface of the isolator such that the operating surface of the bird maybe operated on through the surgical port; and
- wherein the cradle in the closed position provides a complete and stable air seal to be maintained between a bird on the cradle and the surgical port.

According to a second aspect of the invention, there is provided a method of using the surgical isolator and cradle according to any of the preceding claims wherein

- the surgical port is sealed with a first layer of sterile transparent adhesive film;
- the operating surface of the bird is cleaned and sterilized and the bird is placed on the cradle in the open position;
- a narrow strip of transparent adhesive film is placed on the sterile surface the bird,
- a second layer of sterile transparent adhesive film is placed on top on the narrow strip of adhesive film; and
- the cradle is moved into the closed position to ensure stable positioning of the operating surface of the bird, preferably the abdomen, relative to the operating surface of the surgical isolator;
- wherein the first adhesive layer is in contact with the second adhesive layer and a complete air seal is created between the bird and the surgical isolator.

DETAILED DESCRIPTION OF THE INVENTION

In general terms, the invention provides a surgical isolator and cradle and means for using it to provide a contamination free atmosphere in which a surgical procedure can be performed. The surgical procedure involves the surgical-removal of a premature egg in its shell from a bird.

The cloaca is the principle area of contamination within a bird. The cloaca is a chamber linked to both the digestive and reproductive systems of the bird, therefore an egg and faeces may be present in the cloaca at the same time. The egg, prior to entering the cloaca is free of contamination. However, as an eggshell is porous external contamination when the egg passes from the reproductive system through the cloaca is a major problem. Specific methods are required to remove it from the parent bird whilst maintaining sterility and then, because of its prematurity, additional specific methods are required to incubate and hatch it successfully and consistently.

Specifically, the present invention is directed to a surgical isolator and cradle for use in surgical procedures wherein a premature egg is removed in its shell from a parent bird prior to the transfer of the egg to the cloaca. As the present invention is directed to obtaining a germ-free egg, it is imperative that the surgical isolator and cradle provide a sterile environment for the procedure to be carried out in.

Preferably, the surgical isolator should includes a sterile gaseous atmosphere.

According to one embodiment of the invention, the isolator suitable (or surgical manipulation is made of walls, which may be flexible, with at least two gloved ports for surgical manipulation, a separate entry port and a solid isolator floor elevated above ground. In the isolator floor in front of the gloved ports, there is a special surgical port. Preferably, the surgical port may be approximately 200 mm×300 mm.

The birds are presented and held for surgery using an adjustable stainless steel cradle which is pivotally attached or hinged to the underside of the isolator floor below the surgical port.

The surgical isolator and associated equipment may be sterilised using a combination of methods including heat, moisture (steam), radiation and chemicals such as peroxides and/or organic iodine with alcohol. Sterilisation methods that do not impair the viability of the embryo should only be used. Furthermore, to maximise freedom from bacteria and spores, all surgical equipment should be gamma-irradiated.

According to a preferred embodiment of the invention, surgical isolators should be thoroughly cleaned, dried, sprayed with alcohol (exposure time of at least 10 min), dried, fumigated with 2-5% v/v peracetic acid (exposure time at least 20 minutes).

The atmosphere of the surgical isolator may be purged with sterile, filtered air to avoid embryo-toxicity. Electrical and other equipment not suitable for steam, irradiation or peracetic acid sterilization may be sterilized using commercial ethylene oxide sterilising systems applied once, or preferably twice each for 24 hours.

According to another embodiment of the invention adhesive, transparent, sterile, surgical plastic or adhesive films may be used to achieve a stable air seal between the sterilized surface of the bird and the isolator.

According to a preferred embodiment of the invention, the surgical port is preferably seated with a transparent plastic or adhesive film to enable the formation of a complete and stable air seal between the sterilized surface of the bird and the opening to the surgical isolator.

According to a most preferred embodiment the surgical port is sealed with a first layer of sterile transparent adhesive film, a bird is placed on the cradle and the surface of the bird is sterilized, a narrow strip of transparent adhesive film is placed on the sterile surface the bird, a second layer, usually larger, of sterile transparent adhesive film is placed on top on the narrow strip of adhesive film, and the cradle is pivoted into the closed position to ensure stable positioning of the birds abdomen relative to the operating surface of the surgical isolator; wherein the first adhesive layer is in contact with the second adhesive layer and a complete air seal is created between the bird and the surgical isolator.

The adhesive films should be applied to skin of the bird after complete removal of feathers, thorough preparation and sterilisation of the skin and removal of superficial keratocytes and sebum (using detergent, alcohol and organic iodine).

Maintenance of the integrity of the film and facilitation of surgical approach is enhanced by the use of a cradle, which allows stable positioning of the bird's abdomen relative to the operating surface of the surgical isolator.

According to a still further embodiment of the invention confirmation of the seal integrity may be made using fluid test materials such as sterile helium gas released aseptically into the surgical isolator and leaks detected externally by use of a helium gas detector. Alternatively, sterile indicator liquids (such as iodine solution) may be used and detected by visual inspection Preferably, surgical removal of the egg is best completed rapidly, at about less than 30 minutes from time of euthanasia, to avoid impairment of embryo viability. The prolonged use of anaesthetics or excessive delays between euthanasia of the parent bird and removal of the egg will adversely affect embryo viability.

According to a still further embodiment of the invention the surgical procedure for removal of the premature egg from the uterus of the bird includes incision through the adhesive film, incision of the skin of the bird, transaction though the subcutaneous, muscle, and peritoneal layers of the bird. The egg may be removed from the bird either in the intact, sealed (e.g. clamped-off) uterus or directly by incision of the uterus. All direct contact between fluid forms of sterilising solutions should be avoided to counteract any risk of impairment of embryo viability.

Alternatively, the surgical removal comprises:— performing a laparotomy incision and tying off the oviduct of the bird at both ends with sutures;
transecting the oviduct distal to each suture;
removing the egg enclosed in the oviduct;
sterilising the oviduct;
removing the egg; and
sterilising the egg.

The surgical procedure used must ensure that the gut of the bird is not contaminated by waste material and that the egg is not damaged. Aseptic techniques must be used throughout.

Preferably, the bird is sacrificed by euthanasia or killing prior to removal of the egg in its shell. Alternatively, the bird may be euthanized. Female parent birds may be either live or recently killed. Live birds may, as consistent with ethical, legal and animal welfare considerations, be fully conscious, sedated or anaesthetised. Eggs and ova may be either fertilised or unfertilised conscious, sedated or anaesthetised.

According to a preferred embodiment of the invention, the cradle comprises two substantially parallel bars defining a space to receive a bird. In use, the cradle is opened and a bird is placed in the cradle. Preferably, the bars are substantially identical and form an acute angle underneath the isolator floor. The bird is placed in the cradle head first, such that the operating surface of the bird (the uterus and abdomen) is parallel to the isolator floor. The tail end of the bird rests on the cradle bars such that the uterus and abdomen are positioned correctly. The release mechanism on the cradle is then shut and the underside of the bird is then parallel to the isolator floor and surgical port. The surgical procedure for the removal of the premature egg can then take place. The gloved ports in the vaults of the isolator allow access to the underside and operating surface of the bird.

The surgical isolator generally comprises an enclosure surrounding a working area surface having gloved ports, viewing areas and an access panel in the form of a surgical port. There is also a further access panel which enables the aseptic transfer of the surgically-derived egg from the surgical isolator to a transfer unit for subsequent transfer to a incubation isolator.

Preferably, the removal of the egg is at a time prior and as close as possible to the transfer time when the egg would transfer naturally to the cloaca in the parent bird.

The surgically removed egg may then be placed in a sterile container and sealed. The container should allow the egg to cool and be of suitable design and size to for egg storage. A sterile container is one with an approximate volume 10 times that of the egg, with the egg supported and protected by a plastic frame.

According to a further embodiment of the invention, sterility of the entire surgical procedure may be confirmed. This includes collection and evaluation of samples such as microbiological swabs (taken as moist swabs and immediately placed in transport media) from the egg and reproductive tract for isolation of micro-organisms using suitable culture media for bacteria, mycoplasma, viruses and fungi, including liquid broth enrichment media, in aerobic, anaerobic and microaerophilic environments.

Once the sterile surgically-derived premature egg is obtained, the egg may then be incubated in a sterile environment and hatched and reared to produce a laying bird.

According to the invention, for maximum freedom from micro-organisms eggs should preferably be derived aseptically from parent females prior to entry of the egg into the cloaca (unless they are also germ-free or gnotobiotic) and the life-cycle should be completed in sterile isolators. The life-cycle may be completed outside isolators when SPF eggs and birds are produced.

Infectious organisms that may be controlled by the invention include organisms that can be pathogenic or non-pathogenic to the relevant species. These include avian species (typically chickens, fowls and turkeys), humans and other mammals (typically dogs, cats, horses, cattle, pigs, sheep, goats, rats and mice). For the purposes of the invention, micro-organisms include parasites, bacteria (including anaerobic and aerobic species, commensal species and species associated with the gut), mycoplasma, viruses (including retroviruses), prions, fungi, yeasts, moulds and DNA and RNA fragments.

The parent bird is the bird from which the surgically-derived egg is obtained. The surgically-derived egg is then incubated and hatched to form a laying bird. The surgically-derived egg and subsequent laying bird are germ-free.

In one embodiment of the invention the parent bird is chosen from a flock of similar birds all reared under the same conditions.

In another embodiment of the invention, the parent bird is hatched naturally in a sterile environment from a flock of birds of similar existing contamination free status.

In a further embodiment of the invention the parent bird is one of a flock of birds which are of another contaminant free status having been produced by suitable selection and natural rearing methods under controlled conditions and the method is used to provide birds of a different contaminant free status.

Preferably a laying bird forms part of a flock and alter the laying birds are hatched, a sample of the laying birds is removed and tested for specific contaminants to provide a measure of the contaminant free status of the flock. Ideally when the specified contaminant free status is not achieved in the laying bird, the laying bird is used as a parent bird in the method.

Preferably the parent bird is chosen as a day old bird.

In one embodiment the laying bird is removed from the sterile environment to lay eggs which are, in turn, hatched to produce further laying birds.

In another embodiment the laying bird is removed from the sterile environment and fed with food containing normal gutflora. The birds produced by this method, having normal gutflora, preferably without avian and zoonotic pathogens, are suitable for consumption or use in the food industry.

Typically the bird is a chicken.

Preferably when a bird is hatched from a laying bird having the specified contaminant free status and is not a laying bird, the bird so hatched is reared in a sterile environment for subsequent fertilisation of laying birds of the same or lower contaminant free status.

According to a further aspect of the invention, the invention further provides a method of providing an egg of a specified contaminant free status comprising in a sterile environment:

housing a laying bird having the same or better contamination free status as provided in accordance with the method of the invention;

using the laying bird to lay the egg; and removing the egg to another sterile environment.

The laying bird may then be used to lay an egg, which may be the end product itself, or which may hatch into a bird which could either form a flock of birds of germ-free status or if it is not a laying bird, be used to fertilise a laying bird to reach lower contamination status.

If fertile eggs are used to produce offspring or derived birds, then two eggs may be hatched, reared, maintained and bred in either conventional husbandry systems, SPF systems or in isolators to control the entry of micro-organisms.

It will be appreciated that in certain circumstances, when taking selected birds as parent birds, the laying birds produced may not in (act be sufficiently free of contaminants to produce laying birds of the right quality. It may then be necessary to carry out the same steps again using the eggs produced from such laying birds and artificially removing the eggs from these laying birds to provide further laying birds which hopefully will be contaminant free.

Indeed, the sterility can be further improved by feeding the laying birds in the sterile environment, with food containing normal gutflora or sterile food. Preferably, the birds are given, in a sterile environment, sterile food and water. Alternatively, normal flora may be administered to the chick pre-hatching or orally to the bird at any stage after hatching. The normal flora may be one without pathogens. It will be appreciated that when birds are hatched which are not laying birds, they will then be retained for subsequent fertilisation of the laying birds. In this way, the whole flock can be sterile.

It will be possible, in the present invention, to produce simply the eggs for subsequent use. When eggs are required of a germ-free status, the first thing to do is to incubate the eggs by using the desired parent birds. Then, when the parent birds have been tested for specified contaminants to provide a measure of the germ-free status, house that laying bird in another sterile environment and use that laying bird to lay eggs which will have a germ-free status.

A still further embodiment of the invention provides a method for incubating and hatching the surgically derived eggs, and then rearing and breeding from the subsequent birds.

Surgically-derived eggs are premature and their development, for example gastrulation, may be delayed. Also, the eggs may lack certain features of a full-term naturally aid egg, for example there may be reduced cuticle on the shell and pore formation in the shell may be impaired. The shell, its pores and cuticle modulate respiratory gas exchange and hydration of the developing embryo. Therefore standard hatchery practices for normal laid eggs may not be appropriate for optimum viability and can require modification to achieve consistently high hatch of healthy birds from surgically-derived eggs. The specifics conditions required vary with, for example, the species and stage of development when removed from the parent bird. Rearing and breeding the derived bird in a healthy and productive state whilst maintained in a specified contamination free or sterile environment requires adjustments to nutrient contents of diets, especially organic micronutrients such a vitamins, to compensate for losses occurring during sterilization of the diets and from an absence of supply from commensal micro-organisms.

Preferably, the eggs should be allowed to cool after removal (tam the parent bird. They can then be stored, undisturbed for, in the case of chickens at least 24 hours and not more than 72 hours. Storage conditions may have HEPA filtered air and, for chicken eggs a temperature between 15 and 23° C., relative humidity of 50-75% and be free from vibration or sudden jarring.

According to a further embodiment of the invention, for the first 24 hours standard incubation conditions for the species of egg may be used. Thereafter each egg should be carefully monitored for weight loss, incubation temperature, relative humidity and, if appropriate respiratory gaseous exchange especially carbon dioxide and oxygen concentrations in air. The incubation and hatching conditions can be adjusted according to the invention. Ideally, for 55 g surgically-derived premature egg a target weight toss of from approximately 0.4 g/day is desirable. Incubation temperatures of approximately 37.2° C. are preferable initially on Day 0 until Day 18 of incubation and then temperatures of approximately 36.5° C. are desirable until hatching. Relative humidity may initially be set at approximately 40% but should be adjusted according daily according to ventilation rate and daily egg weight loss until Day 18 when relative humidity should be increased to approximately 65%.

A suitable environment for hatched chicks, rearing birds, laying and reproductively active birds is a rigid walled isolator, with HEPA-littered air. The air is maintained at positive pressure and exchanged at frequent intervals (e.g. 10 times/hour for adult birds, taking into account cubic capacity of the isolator and stocking density), floor area of 0.2-0.4 $m^2$/bird, gloves on entry ports protected from damage by birds, and air temperature and lighting controlled to provide conditions similar to those for conventional birds of the same species and stage of life-cycle.

Rearing and breeding a bird in a healthy and productive state whilst maintained in a specified contamination free or sterile environment requires specialised diets to compensate for the tack of certain nutrients normally produced by for example the contaminants found in the gut or on the skin of a bird in a conventional environment.

It will be understood that this invention applies to all avian and reptilian species, including but not limited to chickens, turkeys, quail, ducks, geese, guinea fowl, pheasant, partridge, parrots and grouse.

The invention will be more clearly understood from the following description of the Figures and Examples.

Figure 1:
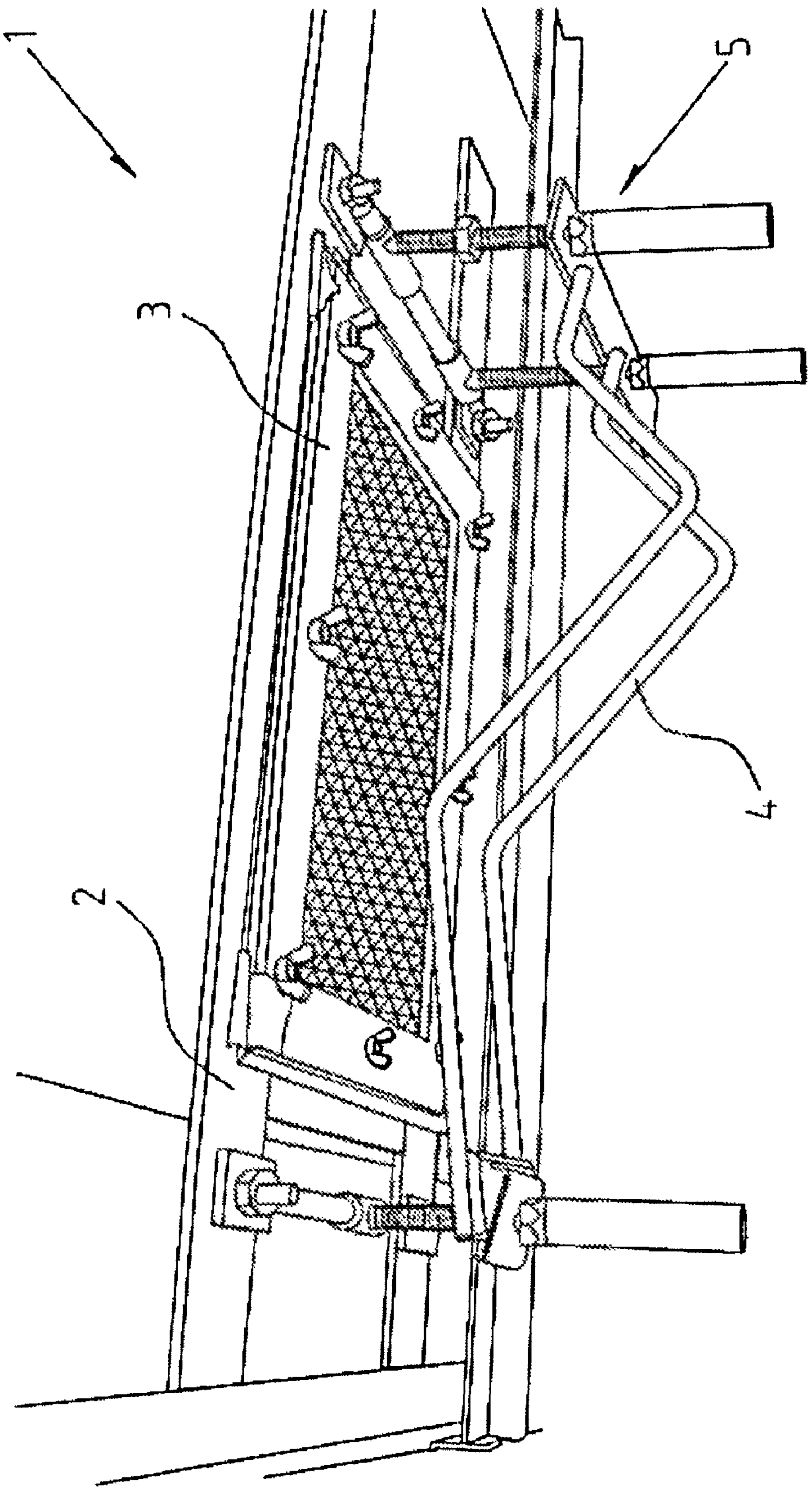
FIG. 1 shows a surgical isolator and cradle according to the invention.

FIG. 1 shows a sterile surgical isolator and cradle for a bird according to the invention. This isolator provides a contaminant-free atmosphere in which a surgical procedure takes place. The isolator (1) comprises an isolator made of flexible walls with at least two gloved ports (not shown), a solid isolator floor (2) which provides an operating surface and a surgical port (3) within the solid isolator floor. The surgical port provides an aperture through which the person carrying out the surgery can access the operating surface of the bird. Attached to the isolator floor is a cradle (4) for receiving and positioning a bird during a sterile surgical procedure. The cradle is pivotally attached or hinged to the underside of the isolator floor below the surgical port, as shown by the hinge (5). The surgical port is adapted to receive the bird in the cradle and to provide a complete and stable air seal to be maintained between a bird an the cradle and the surgical port during surgery. The surgical port aperture is preferably covered with a sterile adhesive film (shown in hatch). This sterile adhesive film provides the stable air seal. The cradle also provides the advantage that it enables the stable positioning of the birds abdomen relative to the operating surface of the surgical isolator.

Figure 2:
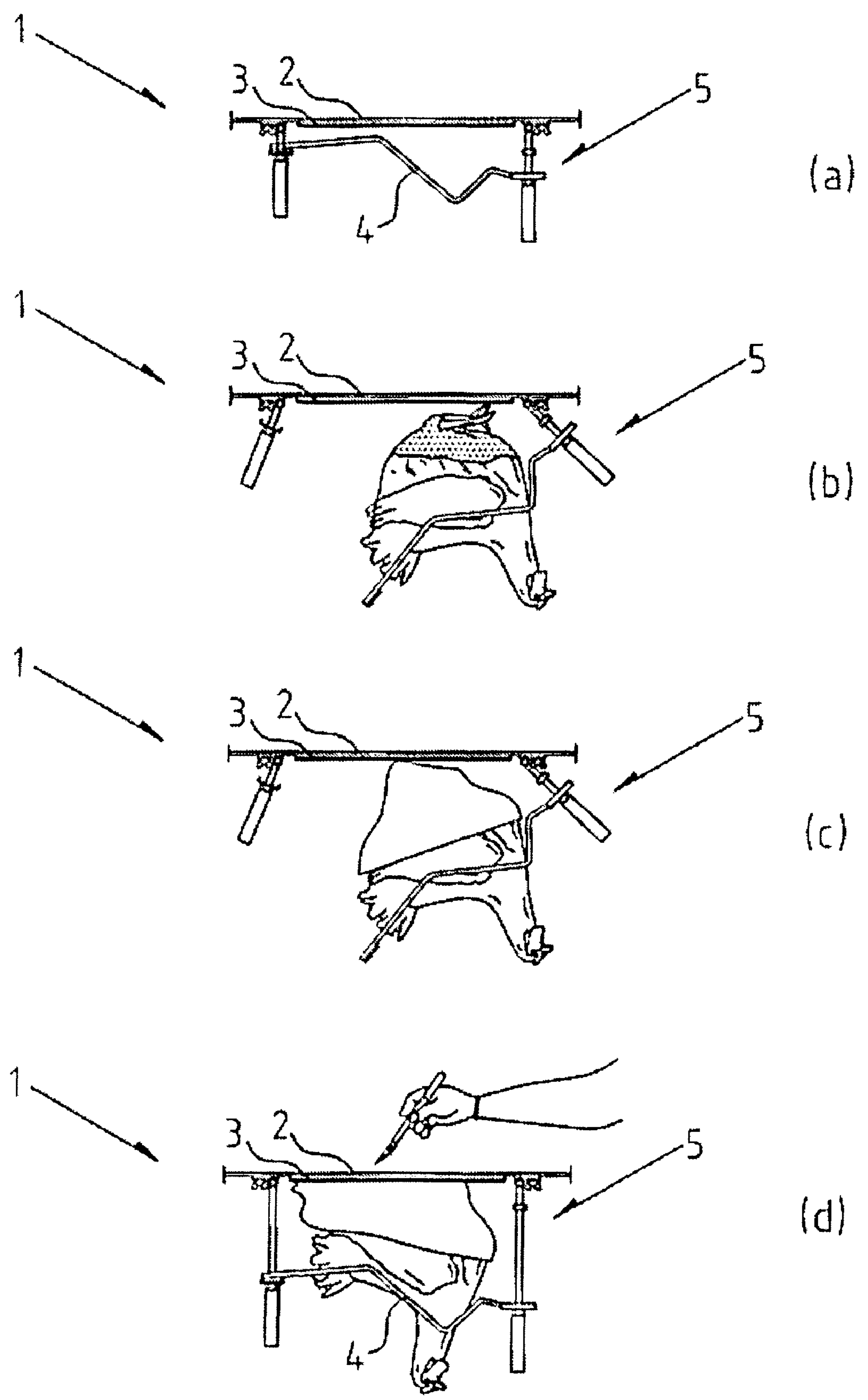
FIG. 2 is a diagrammatic representation of the method of the invention using the surgical isolator and cradle of FIG. 1.
Figure 3:
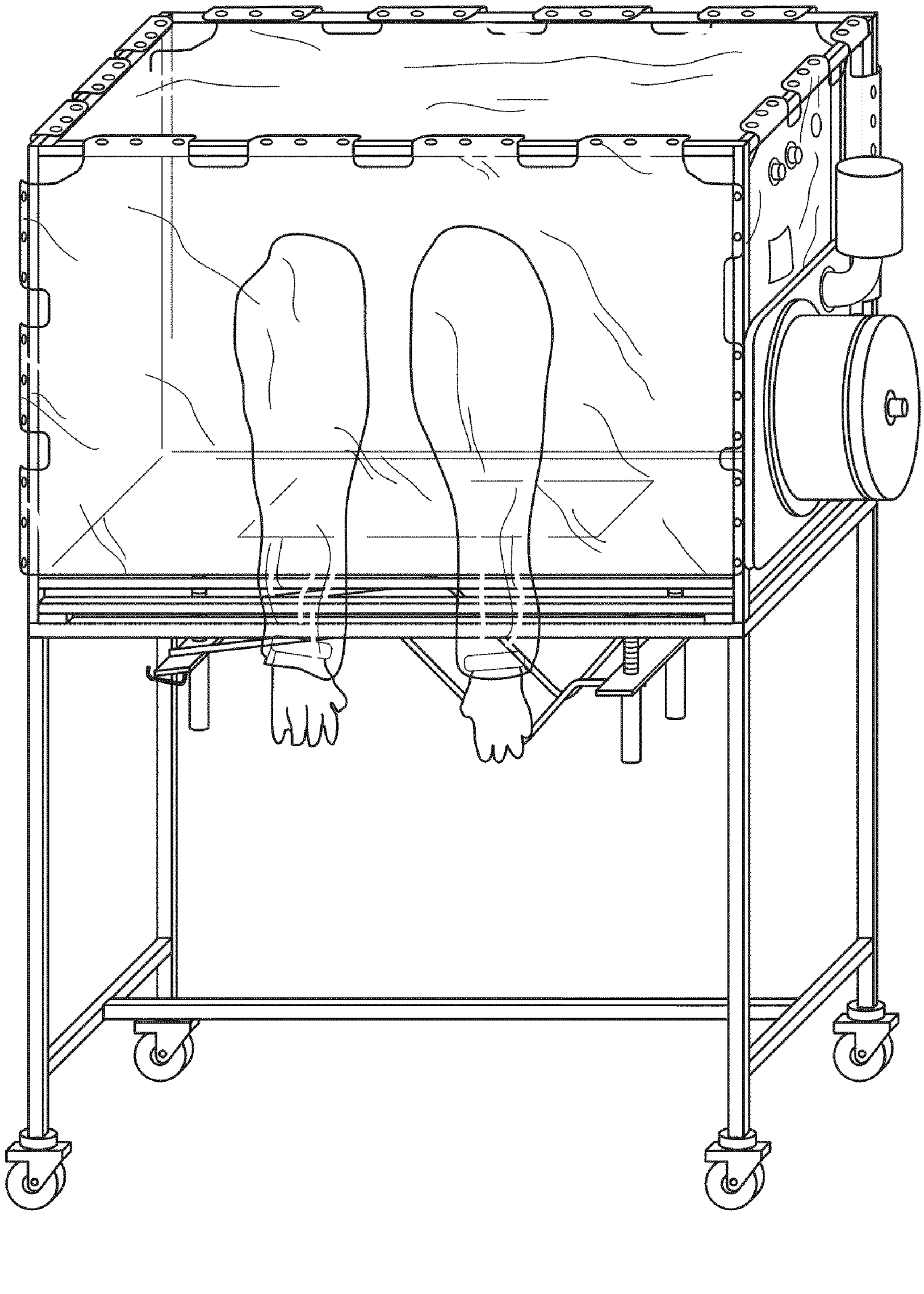

FIG. 2 shows a diagrammatical representation of the method of using the cradle according to the invention.

FIG. 2*a* shows the surgical isolator (1) not in use and in the closed position which comprises an isolator floor (2), surgical port and adhesive film (3), cradle (4) and hinge (5). The cradle is in the closed position. The surgical port (3) is sealed with a first layer of sterile transparent adhesive film.

FIG. 2*b* shows the surgical isolator in an open position such that a chicken may be placed in the cradle. The chicken is placed head first into the cradle and the operating surface of the bird is defeathered and sterilised. The air seal between the bird isolator may be tested before and after surgery using sterile fluid test materials which are released into the surgical isolator to enable external leaks to be detected.

FIG. 2*c* shows a second sterile adhesive film placed on the sterilised underside of the chicken. Preferably, a narrow strip of transparent adhesive film (not shown) is placed on a sterile surface the bird. A second layer of sterile transparent adhesive film is placed on top on the narrow strip of adhesive film. At this stare the cradle is pivoted into the closed position to ensure stable positioning of the birds abdomen relative to the operating surface of the surgical isolator. The bird's abdomen should be parallel to the floor of the surgical isolator to facilitate surgical manipulation, legs should be held in the fully flexed position and cloaca sealed.

FIG. 2*d* shows the cradle in the closed position such that sterile adhesive film of the surgical port and adhesive film on the bird come into contact to form a stable air seal within the surgical isolator and provide a sterile surface to be operated on. When the first adhesive layer on the port is in contact with the second adhesive layer on the bird, a complete air seal is created between the bird and the surgical isolator.

The air seal between the bird and the surgical isolator may be tested before and after surgery using sterile fluid materials which are released into the surgical isolator to enable leaks to be detected.

EXAMPLE 1

Method

Fifty adult female and five adult male chickens of known SPF status were maintained on selected diets and allowed to breed naturally. Timing of egg laying (oviposition) was recorded individually for each female over a two-week period. The mean time of day (time, L) when an egg was laid was calculated for each female. The time of day for L-3h was calculated and the period from L-3 to L was nominated as the derivation to interval. This interval was the time in which aseptic surgical laparotomy was performed for removal of the most developed eggs in each bird.

For the procedure, birds were euthanased by cervical dislocation and shortly afterwards prepared. Birds were submerged in a disinfectant solution for 5 minutes. Feathers were removed from the ventral thorax and abdomen and the exposed skin sterilised using a 50% solution of iodine in alcohol heated to 37° C. Each bird was then placed under a specially adapted surgical isolator sterilised with a 5% solution of peracetic acid and containing sterile instruments and a 500 ml flask containing iodine in alcohol. The bird was covered with a sterile drape and a sterile entry port of the isolator was then placed over the drape. A laparotomy incision was made and the oviduct (typically the uterus) was tied off at both sides of the egg using suture material. The oviduct was then transected distal to each of the sutures from the egg and the oviduct containing the egg was removed from the females' abdomen. The uterus-enclosed egg was then placed in the iodine/alcohol solution for five minutes after which the oviduct-enclosed egg was transferred via an entry port from the surgical isolator to a receiving isolator. In the receiving isolator, the oviduct was incised, the egg removed, swabbed with a disinfectant solution and transferred to an isolator adapted as a hatchery incubator.

Within one day of hatching, live chickens were removed from the hatchery isolator and transferred to two large-scale rearing isolators suitable for rearing groups of young chickens. Chickens were reared on commercial diets sterilised by radiation. At 18 days of age, five chickens were removed from each of the rearing isolators, euthanased and sampled for bacteriology by aerobic and anaerobic culture. Samples included liver, spleen, heart blood, vagina/cloaca, caecal and small intestinal digesta and faeces.

Results

Viable chickens were hatched successfully from the artificially derived eggs (hatchability >50% more often >90%). No anaerobic or aerobic bacteria were isolated from the chickens sampled.

Conclusion

A safe and highly effective method for artificial production of germ-free fertile eggs in chickens was established. Eggs were viable and produced viable germ-free chickens which were successfully maintained in isolators.

EXAMPLE 2

A series of further studies were conducted in accordance with Example 1. Variables anticipated which affect sterility and viability of surgically derived fertile eggs were evaluated in this example. Evaluations made in the studies and the results obtained are provided below.

The results identified the variables that are critical control points required to consistently produce germ-free eggs of high viability High viability is defined as about >50%, hatchability and about >80% reaching reproductive maturity.

Example 2A

Effects of different techniques for sterilising equipment including surgical isolator and instruments. Evaluation included types, quantity and time of radiation, and chemical sterilants (peroxide types, halogen liquids, alcohol) in liquid and vapour forms for different temperatures and times, with and without egg-washing detergent solution on embryo viability and sterility.

Results

Exposure of surgically-removed eggs to alcohol, alcohol and organic iodine at 20, 32 or 37° C., and to peracetic acid solution (2-5% v/v) reduces hatchability from 60-100% (controls) to 13-89%.

Exposure to peracetic acid vapour for >5 min reduces hatchability by 0-28%.

Exposure to iodine solution reduces hatchability by 50%.

Example 2B

Effects of time (zero to 180 minutes) between euthanasia and egg removal on viability and ease of surgical manipulation, hatchability and sterility Results.

Sterility 100%, surgery increasingly difficult alter 30 minutes, hatchability <30% alter 60 minutes.

Example 2C

Effects of different types and methods of application of adhesive films, to create an air seal between parent bird and surgical isolator; methods of testing the seal; devices for positioning bird during surgery to optimise seal formation and surgical manipulation.

Results.

De-fatting and sterilising skin are important for obtaining consistent seal between film and bird skin.

Use of at least two layers of film are required, one adhered to bird, and another in the surgical port of the surgical isolator with adhesive layer adjacent to bird.

Birds' abdomen should be parallel to floor of surgical isolator to facilitate surgical manipulation, legs should be held in fully flexed position, cloaca sealed.

Test integrity of seal before/after surgery using helium gas and or iodine indicator solution, maintain positive pressure and sterile air.

EXAMPLE 3

Example 3A

Effects of difference in lime between expected ovi-position and surgical removal of the egg from the parent bird on egg viability and sterility and ease of surgical manipulation.

Results

Hatchability:

control (naturally laid eggs) 85-100% hatch, 80-100% sterile; eggs removed from uterus within 30 min of anaesthesia or euthanasia, 13-40% hatch, 80-100% sterile;

eggs removed from uterus 60 min after euthanasia, 14% hatch, 80.92% sterile.

Ease of Surgical Manipulation:

control not applicable;

30 minutes, good, tissues easily elevated;

60 minutes, difficult, tissues difficult to elevate/early rigor mortis)

Example 3B

Effects of limed ovi-position versus palpation versus combination of these techniques on proportions of eggs with complete shells versus soft shells, viability (usually life chicks at time of hatching) and on ease of surgical manipulation. Results.

Timing alone, soft shells and no suitable egg for removal 8-71%, viability 13-50%, sterility 75-100%, ease of surgical manipulation, variable.

Palpation alone, soft shells & no suitable egg for removal 13-71%, viability 13-54%, sterility 89-100%, ease of surgical manipulation, good;

Timing combined with palpation, soft shells and no suitable egg for removal 10-23%, viability 14-57%, sterility 92-100%, ease of surgical manipulation, good).

Example 3C

Effects of antibiotics (e.g. orally administered fluroquinolones) on elimination of transovarian bacterial and mycoplasmal infections and an viability and sterility of embryos and subsequent chicks.

Results.

Without antibiotics, viability 22-60%, and sterility 66-92%;

With antibiotics, viability 13-57%, and sterility 89-100%.

Example 3D

Effects of pre-incubation storage time (0 to 5 days) and conditions, (temperature, humidity, egg orientation, ventilation, vibration), incubations conditions (temperature, humidity, ventilation, orientation, weight loss), handling and hatching conditions on embryo viability Results.

Storage times of 0, 1-3, 4-5 days, hatchability was 90, 90 and 60%, respectively. Temperature, ventilation/vibration (or storage of 3 days: 25 C. and with vibration/ventilation, approximately 20 C and no vibration/ventilation; hatchability was 60% and 80%, respectively.

Egg orientation and weight loss: eggs flat on side, weight loss 7.8%, eggs domed-end upper-most, weight loss 10.2-13.1%; hatchability 30% and 80-901, respectively.

CONCLUSION

As expected given the wide range of variable investigated, a wide variety of results for viability and sterility were obtained. The results identified the variables that are critical control points required to consistently produce germ-free eggs of high viability High viability is defined as about >50% hatchability and about >80% reaching reproductive maturity.

The invention claimed is:

1. A sterile surgical isolator and cradle for a bird which provides a contaminant-free atmosphere in which a surgical procedure is performed comprising:

an isolator made of walls with at least two gloved ports, a solid isolator floor which provides an operating surface and a surgical port within the solid isolator floor;

a cradle for receiving and positioning a bird during a sterile surgical procedure having an open and closed position;

wherein the cradle enables the stable positioning of the operating surface of the bird relative to the operating surface of the isolator such that the operating surface of the bird maybe operated on through the surgical port; and wherein the cradle in the closed position provides a complete and stable air seal to be maintained between a bird on the cradle and the surgical port.

2. The sterile surgical isolator and cradle according to claim 1 wherein the surgical port is sealed with a transparent film during use.

3. The sterile surgical isolator and cradle according to claim 1 suitable for surgery involving the removal of a premature egg from the uterus of a bird.

4. The sterile surgical isolator and cradle according to claim 1 wherein the cradle is pivotally attached or hinged to the underside of the isolator floor below the surgical port.

5. The sterile surgical isolator according to claim 1 wherein the cradle is attached to the isolator floor at one end by a pivot or hinge means and is attached at the opposite end via a releasable mechanism.

6. A method of using the surgical isolator and cradle according to claim 1 wherein:

the surgical port is sealed with a first layer of sterile transparent adhesive film;

the operating surface of the bird is cleaned and sterilized and the bird is placed on the cradle in the open position;

a narrow strip of transparent adhesive film is placed on the sterile surface the bird;

a second layer of sterile transparent adhesive film is placed on top on the narrow strip of adhesive film; and the cradle is moved into the closed position to ensure stable positioning of the operating surface of the bird, preferably the abdomen, relative to the operating surface of the surgical isolator;

wherein the first adhesive layer is in contact with the second adhesive layer and a complete air seal is created between the bird and the surgical isolator.

7. The method according to claim 6 wherein the air seal between the bird and the surgical isolator is tested using sterile fluid test materials which are released into the surgical isolator to enable external leaks to be detected.

8. The method according to claim 7 wherein the fluid test material is sterile helium gas.

* * * * *